United States Patent Office 3,431,583
Patented Mar. 11, 1969

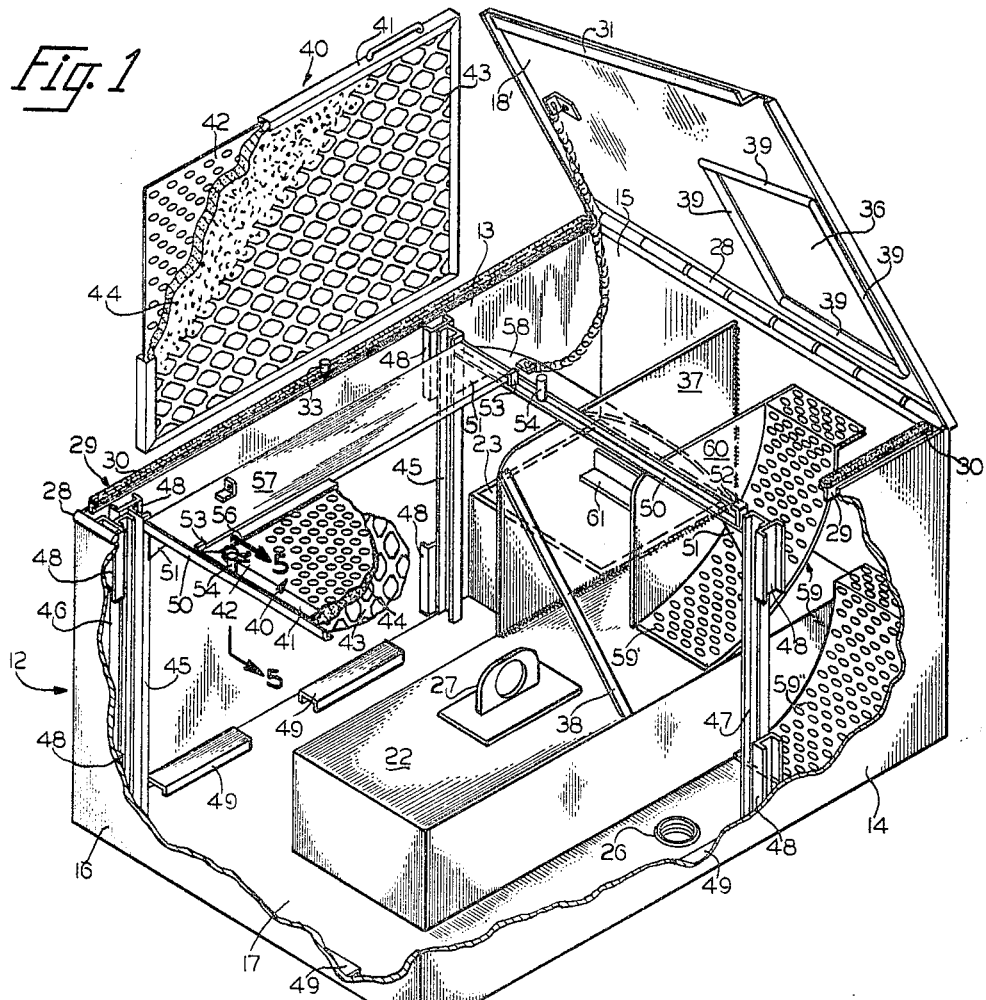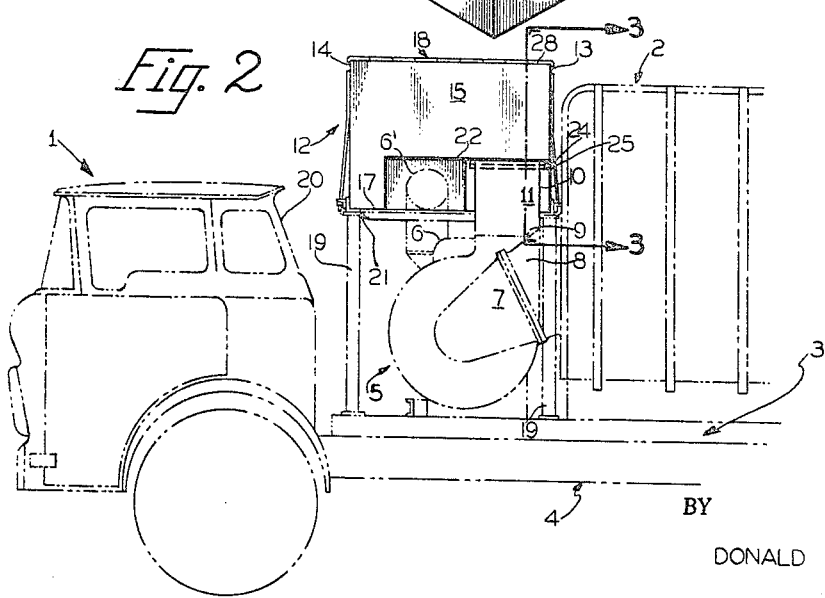

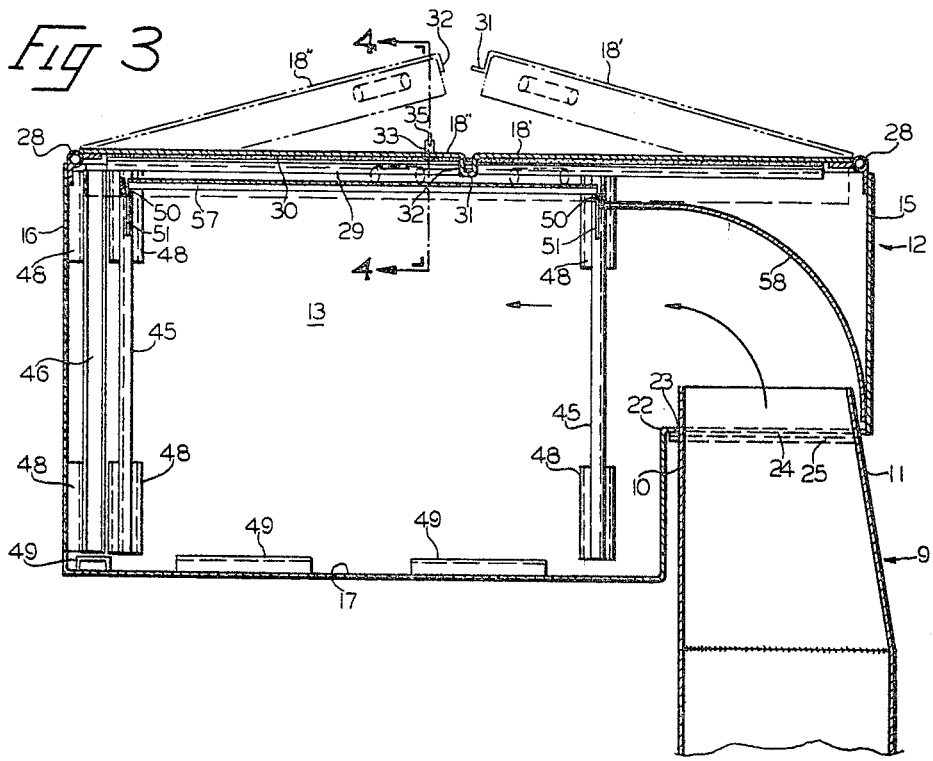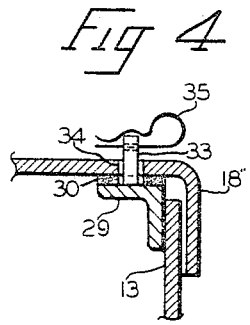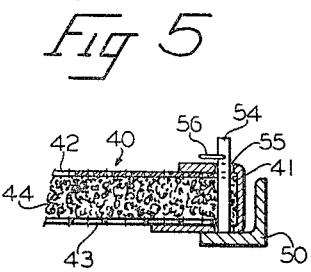

3,431,583
SOUND ATTENUATOR FOR VACUUM-TYPE
DEBRIS COLLECTOR
Ben Daneman, Milwaukee, Wis., assignor to Central
Engineering Company, Inc., Milwaukee, Wis., a
corporation of Wisconsin
Filed May 4, 1966, Ser. No. 547,622
U.S. Cl. 15—326
Int. Cl. A47l 7/08, 9/10; E01h 1/08
9 Claims

ABSTRACT OF THE DISCLOSURE

A sound attenuator for a vacuum-type debris collector blower, including an attenuator box which has walls and an inlet opening for the blower's exhaust duct and an outlet opening, sound-absorbent, air-pervious material contained in acoustical panels removably mounted in the proximity of but spaced from box walls for attenuating sound and filtering dirt and water from the blower's exhaust air, and baffles (including a perforated baffle adjacent the outlet opening) for directing the circuitous flow of the air generally through the box and the sound-absorbent material to the outlet opening.

---

This invention relates to a sound attenuator for vacuum-type debris collectors used for vacuuming trash and litter from highways, streets and the like.

The use of vacuum-type debris collectors to remove debris from roads and streets is known in the art. One type of collector is shown in Patent No. 3,052,908 issued Sept. 11, 1962, to the inventor and includes an enclosed vacuum tank, which contains air filters and is mounted on a truck chassis. A flexible nozzle may be selectively connected to openings in the side and the rear of the tank. A high vacuum is maintained in the tank by a high pressure vacuum-inducing blower, which is driven by an auxiliary internal combustion engine and ducted to the tank. Suction thereby is provided at the suction end of the flexible nozzle, which may be used to vacuum-clean the street or road. The air and debris which is sucked into the suction end of the nozzle passes through the nozzle into the vacuum tank and through the filters in the tank. A substantial portion of the debris which is carried by the air is trapped by filters and remains in the tank. The filtered air is drawn from the tank by the blower and exhausted from the blower through a blower exhaust duct at a high velocity to the atmosphere.

The noise created by the rotating internal mechanical components of the blower and the high velocity at which the air is exhausted from the blower combine to create a substantial amount of noise, which the exhausted air carries to the atmosphere and which has proved to be objectionable, particularly when the debris collector is operated in residential areas. In addition, because the mesh of the vacuum tank filters necessarily must be somewhat coarse in order to permit the relatively unimpeded flow of air therethrough which is required if the blower is to operate efficiently, the filters trap only debris of substantial size (such as paper and leaves). Small particles of dirt and water pass through the filters and the blower and are exhausted to the atmosphere, where they either fall and collect on the debris collector truck, giving the truck a dirty appearance, or on automobiles or pedestrians in the immediate vicinity of the truck, with similar objectionable consequences.

The present invention provides a sound attenuator for attenuating or silencing the sound carried by the air which is exhausted from the blower exhaust duct. The attenuator includes an attenuator box having an inlet opening, with the inlet opening communicating with the blower exhaust duct. The top wall of the attenuator box contains an outlet opening and is openable from a closed position in which it is in substantially air-tight communication with the top edges of the rear, front and side walls of the attenuator box. Acoustical panels containing sound-absorbent material are removably mounted in the attenuator box in normal positions in the proximity of but spaced from walls thereof. The attenuator box contains baffles for directing the circulation of air on a circuitous path therethrough, including a perforated baffle adjacent the outlet opening.

The air exhausted from the blower exhaust duct enters the attenuator box through the inlet opening, circulates through the attenuator box (and, in the course of such circulation, strikes the sound-absorbent material in the acoustical panels which absorbs the sound carried by the air), is deflected upwardly by the perforated baffle (which further attenuates the sound carried by the air) and is exhausted upwardly through the outlet opening. The sound absorbent material also may trap and collect particles of dirt and water which are carried by the air and which otherwise would be exhausted to the atmosphere. If at any time the sound-absorbent material becomes so impregnated with entrapped dirt and water that the sound-absorbent material ceases to efficiently attenuate the air, the top wall may be opened from its closed position and the panels may be quickly and easily raised from their normal positions and removed from the attenuator box, cleaned and replaced in the box.

The best mode presently contemplated of carrying out the invention is illustrated in the accompanying drawings, in which FIGURE 1 is a perspective view of a sound attenuator embodying the present invention, with parts of the attenuator box broken away to illustrate details of construction, and with one of the acoustical panels raised from its normal, vertical position within the attenuator box and with another acoustical panel mounted in its normal, horizontal position.

FIGURE 2 is a side elevational view of the front end of a debris collector truck, showing the sound attenuator of FIGURE 1 mounted thereon.

FIGURE 3 is a fragmentary vertical transverse sectional view taken upon plane 3—3 of FIGURE 2 through the blower exhaust duct and the interior of the attenuator box, from which the acoustical panels have been removed, and illustrating the top wall in its closed position and the relationship between the inlet opening of the attenuator box and the blower exhaust duct.

FIGURE 4 is an enlarged fragmentary sectional view taken upon plane 4—4 of FIGURE 3, illustrating the top wall in its closed position overlying the top edge of the rear wall of the attenuator box.

FIGURE 5 is an enlarged fragmentary sectional view taken upon plane 5—5 of FIGURE 1, illustrating one of the acoustical panels mounted in its normal horizontal position.

The attenuator is mounted on a self-propelled truck or like vehicle 1. A fully enclosed and self-contained vacuum tank 2, which may be of any suitable type and, as illustrated herein, is of the type and mounted on the truck as described in Patent No. 3,052,908 issued Sept. 11, 1962, to the inventor, is mounted on a hoist frame 3 attached to the frame rails 4 of the truck 1. A high vacuum is induced and maintained in the tank by a high pressure vacuum-inducing blower 5, driven by an auxiliary internal combustion engine 6 having an exhaust muffler 6' and ducted to the tank 2 by a blower intake duct 7 and a tank duct 8. As shown herein, the blower 5, the drive therefor, the auxiliary engine 6 and the ducts 7 and 8 are as described in such patent. The blower intake duct 7 and the tank duct 8 are registerable with each other and abut tightly against one another when the tank 2 is in its lower or operating position, and thus air is drawn from the tank 2 by means of the blower 5.

The air drawn from the tank 2 by the blower 5 is exhausted upwardly from the blower 5 through an upstanding blower exhaust duct 9. The blower exhaust duct 9 is of generally rectangular cross-section and has three vertical sides 10 and a fourth side 11, which is adjacent the blower intake duct 7 and is tapered to guide the tank duct 8 into registration with the blower intake duct 7 when the tank 2 is lowered to its lower or operating position.

*Attenuator box*

The attenuator box 12 is a welded metal box having a rear wall 13, a front wall 14, side walls 15 and 16, a bottom wall 17, and a top wall 18.

Support for the attenuator box 12 is comprised of the hoist frame 3 of the truck 1, four vertical legs 19 fixedly attached to the hoist frame 3 (two of which are attached in positions behind the cab 20 of the truck 1 and forward of the auxiliary internal combustion engine 6, and two of which are attached in positions behind the auxiliary internal combustion engine 6 and forward of the tank 2), and a rectangular frame 21 which is welded to the tops of the legs 19 and on which the attenuator box 12 is removably mounted (as by bolting).

As illustrated, the bottom wall 17 includes a raised, L-shaped, bottom section 22 made necessary by the dimensions of the attenuator box 12 and by the relative positions of the bottom wall 17, the exhaust muffler 6' of the internal combustion engine 6 and the blower exhaust duct 9 when the attenuator box 12 is mounted on the truck 1 in the location shown in the accompanying drawings. When mounted in such location, with the top section 18 approximately coplanar the top of the tank 2 (so that the overall height of the truck 1 will not exceed the height limitations of highway underpasses and the like), the plane of the bottom wall 17 is below the exhaust muffler 6' and below the top of the blower exhaust duct 9. The raised bottom section 22 accommodates and surrounds the exhaust muffler 6' and permits the tapered side 11 of the blower exhaust duct 9 to remain unobstructed and exposed to the tank duct 8, so that the tapered side 11 may guide the tank duct 8 into registration with the blower intake duct 7 when the tank 2 is lowered. However, the raised bottom section 22 is not essential to the attenuating function of the attenuator and, therefore, is not a material or limiting element of the present invention.

Each of the walls 13, 14, 15, 16, 17 and 18 is substantially imperforate (i.e., they do not contain any openings through which air or water freely may flow, except the inlet and exhaust or outlet openings and the drain opening and openable access door hereinafter described). A rectangular inlet opening 23, through which the air exhausted from the blower exhaust duct 9 may enter the attenuator box 12, is located in the raised bottom section 22 adjacent the corner of the attenuator box 12 formed by rear wall 13 and side wall 15. The inlet opening 23 is adapted to receive the flow of air exhausted from the blower exhaust duct 9. When the attenuator box 12 is mounted on the frame 21, the top of the blower exhaust duct 9 projects through the inlet opening 23 into the attenuator box 12, and the inlet opening 23 thereby communicates with the blower exhaust duct 9. It has been found that, when air is exhausted from the blower exhaust duct 9 into the attenuator box 12, the back pressure exerted by the air causes air to leak out of the attenuator box through the portion of the inlet opening 23 adjacent the sides 10 and 11 of the exhaust duct 9. In order to provide a substantially airtight seal against such leakage, gasket material 24 is adhesively mounted on the upper surface of flanges 25 welded to and extending outwardly from the three vertical sides 10 of the exhaust duct 9. When the attenuator box 12 is mounted on the frame 21, the raised bottom section 22 compresses the gasket material 24, and the inlet opening 23 thereby is placed in substantially airtight communication with the blower exhaust duct 9.

The bottom wall 17 also includes a drain opening 26, whereby water which has collected on the bottom wall 17 may drain from the attenuator box 12. A metal loop 27 is welded to the top of the raised bottom section 22, to which a hoist chain or cable may be connected when it is desired to raise and remove the attenuator box 12 from the frame 21.

In order to provide access to the interior of the attenuator box 12, it is desirable that one of the walls 13, 14, 15, 16, 17 or 18 be an openable access wall removably mounted on the attenuator box 12. It is preferred to employ the top wall 18 for this purpose because it is readily accessible to a man standing on the top of the tank 2 and because its weight, when in its closed position, can be exploited to provide a relatively airtight seal between the top wall 18 and the walls 13, 14, 15 and 16. In the illustrated embodiment, the dimensions of the top wall 18 are substantial; and, if the top section 18 was constructed of steel or a similarly heavy metal and was mounted on the attenuator box 12 so that the top wall 18 had to be lifted off of the attenuator box 12 to gain access to the interior, more than one man would be required to open the attenuator box 12. Accordingly, as shown, the top wall 18 is comprised of two aluminum sections 18' and 18", which respectively are pivotally connected, by means of continuous hinges 28, to the top edges of the side walls 15 and 16. The top wall sections 18' and 18" thereby may be pivoted by one man on the continuous hinges 28 from a horizontal or closed position (in which they overlie the top edges of the rear and front walls 13 and 14) to an open position. Means are provided for creating a substantially airtight seal between the top wall 18, in its closed position, and the rear and front walls 13 and 14; for preventing the top wall 18 from noisily rattling against the top edges of the rear and front walls 13 and 14 when the truck 1 is being driven or the blower 5 is being operated; and for providing stiffness to the upper portions of the rear and front walls 13 and 14. Stiffeners 29, of inverted L-shaped cross-section, are welded to the interior surfaces of the rear wall 13 and the front wall 14 adjacent with top edges thereof, with their top horizontal surfaces slightly above the top edges of the walls 13 and 14. Compressible gasket material 30 (such as, for example, sponge rubber) is adhesively mounted on the top horizontal surfaces of the stiffeners 29. When the top wall sections 18' and 18" are in their closed position, they overlie and, due to their weight, compress the gasket material 30, forming a substantially airtight seal between the top wall 18 and the rear and front walls 13 and 14.

In order to provide a relatively airtight seal between the inside edges of the two top wall sections 18' and 18", the inside edge of the top wall section 18', which is above the inlet opening 23, defines an L-shaped flange 31; and the inside edge of the other top wall section 18", a downwardly extending flange 32. When the sections 18' and 18" are in the closed position, the bottom edge of the flange 32 abuts against the horizontal surface of the L-shaped flange 31. The air exhausted into the attenuator box through the inlet opening 23 flows away from the inlet opening 23 and past the closed side of the L-shaped flange 31, resulting in virtually no leakage of air between the flanges 31 and 32.

Means for holding the top wall 18 in its closed position are provided and comprise a pair of upstanding pins 33, each of which is welded to a top horizontal surface of a stiffener 29 inwardly of the side wall 16. When the top section 18" is pivoted downwardly to its closed position, the pins 33 are inserted through openings 34 in the top section 18". Cotter pins 35, which are inserted through an opening adjacent the top of the pins 33, prevent both the top section 18″ and (because of the abutting relationship between the inside edge flange 32 of the top section 18″ and the horizontal surface of the L-shaped flange 31 of the top section 18′) the top section 18′ from pivoting upwardly from the closed position.

An outlet or exhaust opening 36 is provided to permit the air which has been exhausted into the attenuator box 12 from the blower exhaust duct 9 and circulated through the attenuator box 12 to be exhausted to the atmosphere. Although it is contemplated that the outlet opening 36 may be located in one of the other walls 13, 14, 15 or 16 of the attenuator box 12, or in the bottom wall 17 thereof, it is preferred to locate the outlet opening 36 in the top wall 18, in order that the air will be exhausted upwardly and will not strike passing pedestrians or motor vehicles. Although the outlet opening 36 may be located in other portions of the top wall 18, it is preferred to locate it in the proximity of the inlet opening 23, and to separate the outlet opening 36 from the inlet opening 23 by air-flow direction means, such as a rectangular air separation plate 37, to ensure that the air will completely circulate within the attenuator box 12 before being exhausted therefrom. Accordingly, as illustrated, the outlet opening 36 is located in the portion of the top wall section 18′ which is adjacent the corner of the attenuator box 12 formed by the side wall 15 and the front wall 14. The air separation plate 37 is mounted in the attenuator box 12 extending upwardly from the top of the raised bottom section 22 adjacent the front edge of the inlet opening 23, with the top edge of the air separation plate 37 adjacent the top wall section 18′. The plate 37 is welded to the side wall 15 and to the top of the raised bottom section 22, and is supported in a vertical position parallel to the rear wall 13 by an angled support bar 38 welded to the plate 37 and the raised bottom section 22. The air separation plate 37 thereby prevents the flow of air directly from the inlet opening 23 to the outlet opening 36, notwithstanding their proximity to each other, and ensures that the air will circulate within the attenuator box 12 before being exhausted through the outlet opening 36.

Rods 39 are welded to the underside of the top wall section 18′ adjacent the edges of the outlet opening 36 to enhance the rigidity of the periphery of the outlet opening 36.

*Acoustical panels*

Four acoustical panels 40 are provided for mounting in the attenuator box 12 to absorb sound carried by the air which is exhausted into the attenuator box 12 from the blower exhaust duct 9. Each panel 40 is comprised of a rectangular frame 41 of generally U-shaped cross-section, a perforated metal back plate 42, and an expanded metal front plate 43 containing a plurality of spaced openings. The space between the back plate 42 and the front plate 43 in each panel 40 is filled with a sound-absorbent material 44 which, in addition to its sound-absorptive qualities, also has the property of being pervious to air and is capable of entrapping particles of dirt and water carried by the air. It is preferred to use a material such as copper wool for this purpose, because (in addition to its sound-absorptive qualities) it has the properties of resisting water corrosion and water absorption. It is contemplated that the present invention encompass other means whereby the sound absorbent material 44 is mounted on the walls of the attenuator box 12. It is preferred, however, to contain such material 44 in acoustical panels 40, in order that the material 44 may be confined and may be readily removed and replaced in the attenuator box 12.

Although it is contemplated that the present invention encompass attenuators in which the panels 40 are fixedly mounted in the attenuator box and attenuators in which the panels 40 are mounted on walls of the attenuator box 12, it is preferred that they be removably mounted in the attenuator box 12, in order that they may be removed and cleaned of entrapped dirt and water from time to time, and that they be mounted in the proximity of but spaced from walls thereof, in order that air which has flowed through the panels 40 may flow back to the interior of the attenuator box 12 by flowing on a circuitous path generally around and under the frames 41 thereof or back through the panels 40. Panel receiving members are provided and are mounted adjacent walls of the attenuator box 12 and are adapted to receive the panels 40. As shown in FIGURE 1, pairs of parallel, panel receiving members 45, 46 and 47, of generally U-shaped cross-section, are vertically mounted adjacent the rear wall 13, the side wall 16 and the front side wall 14, respectively, of the attenuator box 12 on legs 48 welded to the walls 13, 14 and 16. Three of the panels 40 may be slidably inserted in the pairs of panel receiving members 45, 46 and 47, respectively, and lowered to rest on footings 49 welded to the bottom wall 17. A fourth or top panel 40 may be mounted in a horizontal position adjacent but distant from the top wall 18, in its closed position, on a pair of parallel panel receiving members 50, of generally L-shaped cross-section. Although it is contemplated that the present invention encompass attenuators in which the panel receiving members 50 are mounted on the top wall 18, it is preferred to mount the members 50 in the attenuator box 12, in order to reduce the weight of the top wall 18. Accordingly, each member 50 extends horizontally between and is welded at its ends to a member 45 and a member 47 adjacent the tops thereof. Gussets 51 are welded between each member 50 and the members 45 and 47 to additionally strengthen and position the member 50 between the members 45 and 47.

The top panel 40 may be laid on the panel receiving members 50, with one edge of the top panel 40 inserted under an inverted angle 52 welded to the inside horizontal and vertical surfaces of each member 50 adjacent one end thereof, and with the opposite edge of the top panel 40 resting against a block 53 welded to the inside surfaces of each member 50 adjacent the other end thereof. Although it is contemplated that the present invention encompass attenuators in which the inverted angles 52 are located on the members 50 adjacent the ends thereof which are welded to the members 45, and the blocks 53 are located adjacent the other ends thereof, it is preferred to employ the converse thereof and to locate the inverted angles 52 adjacent the members 47 (and, therefore, adjacent the front wall 14), in order that a man standing on the top of the vacuum tank 2 may easily grasp the top panel 40 and, by drawing the top panel 40 toward him, withdraw it from under the inverted angles 52 and remove the top panel 40 from the attenuator box 12.

In order to prevent the end of the top panel 40 adjacent the blocks 53 from rising off of the panel receiving members 50 when the truck 1 strikes a bump or the like, an upstanding pin 54 is welded to the inside horizontal surface of each member 50 intermediate the block 53 and the inverted angle 52 thereon. When the top panel 40 is laid on the members 50, the pins 54 are inserted through openings 55 in the frame 41 of the top panel 40; and cotter pins 56 are inserted through the tops of the pins 54 to prevent the upward movement of the top panel 40. The inverted angles 52 prevent the upward movement of the end of the top panel 40 inserted thereunder.

It is preferred that all of the panels 40 be of substantially the same size and construction, for simplicity and economy of manufacture, although it is contemplated that the present invention encompass panels 40 of different relative sizes and construction. As a consequence of the dimensions and shape of the attenuator box 12 illustrated in the drawings, a space exists between the edge of the top panel 40 which rests against the blocks 53 and the top edge of the panel 40 which is mounted in the pair of panel receiving members 45 adjacent the rear wall 13. In order to prevent the flow of air upwardly through such space, which would cause the top wall 18 to rise and "drum," an insert plate 57, dimensioned to extend between the members 50 and between the top panel 40 and the panel 40 mounted in the pair of members 45, is welded at its ends to the inside surfaces of the members 50.

Baffles

Additional air-flow direction means are provided for affecting a plurality of changes in the direction of flow of air exhausted from the exhaust duct, whereby the air will circulate on a circuitous path through the attenuator box 12. The air thereby is prevented from flowing from the inlet opening 23 upwardly and directly to the outlet opening 36. A curved inlet baffle 58 is provided to change the direction of flow of the air exhausted from the blower exhaust 9 into the attenuator box 12 from an upward direction to a substantially horizontal direction and is attached to the attenuator box 12, with its bottom edge welded to the side wall 15 adjacent the inlet opening 23 and with the curved portion thereof extending upwardly above the inlet opening 23 and toward the other side wall 16. The rear edge of the curved portion of the inlet baffle 58 is welded to the rear wall 13, and the front edge thereof, to the air separation plate 37. In order to prevent the air exhausted from the exhaust duct 9 from flowing upwardly and striking the top wall 18, the top edge of the inlet baffle 58 extends to and is welded to the underside of the member 50 adjacent the inlet opening 23.

The horizontal direction of the flow of the air exiting from the attenuator box 12 is changed to a vertical direction, so that the air will flow upwardly through the outlet opening 36, by a curved outlet or exhaust baffle 59 attached to the attenuator box 12 adjacent the outlet opening 36. As shown, the outlet baffle 59 is comprised of two baffle sections 59' and 59", because of the intrusion of the raised bottom section 22 into the interior of the attenuator box 12. The top edges of the baffle sections 59' and 59" each are welded to the side wall 15 below the outlet opening 36, and the curved portions of the baffle sections 59' and 59" extend downwardly and toward the other side wall 16. As shown, the bottom edge of the baffle section 59' is welded to the top of the raised bottom section 22, and the bottom edge of the baffle section 59", to the bottom wall 17. The front and rear edges of the curved portion of the baffle section 59" respectively are welded to the front wall 14 of the attenuator box 12 and to the side of the raised bottom section 22. The rear edge of the curved portion of the baffle section 59' is welded to a vertical, rectangular baffle stiffener 60, which extends upwardly from the top of the raised bottom section 22. The baffle stiffener 60 is welded to the raised bottom section 22 and the side wall 15 and is supported in its vertical position by a horizontal support bar 61 welded at its ends to the baffle stiffener 60 and to the air separation plate 37.

Although it is contemplated that the present invention encompass attenuators employing unperforated baffles, it is preferred that the outlet baffle 59 be perforated with a multiplicity of spaced openings, because it has been found that, when the air circulating in the attenuator box 12 strikes the perforations in the outlet baffle 59, the perforations tend to break up sound waves remaining in the air, substantially attenuating or silencing the noise carried by the air.

Attenuator function

When the blower 5 is operated to induce a vacuum in the tank 2, the air drawn from the tank 2 by the blower 5 is exhausted by the blower 5 through the blower exhaust duct 9 and inlet opening 23 into the attenuator box 12. The exhausted air strikes the inlet baffle 58, which deflects the air and changes the direction of its flow from an upward direction to a substantially horizontal direction. The air then strikes the four acoustical panels 40. Some of the air passes through the openings in the expanded metal front plate 43 of the panels 40, through the sound-absorbent material 44 which fills each of the panels 40 and which absorbs sound carried by the air, and through the perforations in the perforated metal back plate 42. Because each panel 40 is mounted a distance from the walls 13, 14, 16 and 18, the air then flows around the frames 41 of the panels 40 or back through the panels 40 and returns to the interior of the attenuator box 12. The circulating air ultimately strikes the perforated outlet baffle 59, which deflects the air and changes the direction of the flow thereof so that the air then flows upwardly through the outlet opening 36 in the top wall 18 of the attenuator box 12 and to the atmosphere. The perforations in the outlet baffle 59 tend to break up sound waves not absorbed by the sound-absorbent material 44 in the panels 40, thereby further attenuating the air before it is exhausted from the attenuator box 12.

If the sound-absorbent material 44 in the panels 40 becomes so impregnated with particles of dirt and water that the sound-absorptive quality of the material 44 thereby is materially impaired, the top wall 18 may be opened by removing the cotter pins 35 from the pins 33 and pivoting each of the top sections 18' and 18" upwardly on the continuous hinges 28 from their closed positions to their open positions. The three panels 40 mounted adjacent the walls 13, 14 and 16 may be raised upwardly and out of the pairs of panel receiving members 45, 46 and 47 and removed from the attenuator box 12. The top panel 40 resting on the panel receiving members 50 may be removed by removing the cotter pins 56 from the pins 54, lifting the end of the top panel 40 resting against the blocks 53 so as to withdraw the pins 54 from the openings 55 in the frame 41 of the top panel 40, and withdrawing the top panel 40 from under the inverted angles 52 and out of the attenuator box 12. The several panels 40 may be cleaned by shaking or by flushing the dirt and water out of the sound-absorbent material 44 in the panels 40, and the panels 40 then may be replaced in the pairs of panel receiving members 45, 46, 47 and 50.

Various modes for carrying out the invention are contemplated as being within the scope of the following claims, particularly pointing out and particularly claiming the subject matter which is regarded as the invention.

I claim:

1. A sound attenuator for the exhaust duct of the vacuum-inducing blower of a vehicle-mounted vacuum debris collector, comprising
    an attenuator box mounted on the vehicle and having substantially imperforate walls with an inlet opening adapted to receive the flow of air exhausted from the exhaust duct and with an outlet opening, whereby air exhausted from the exhaust duct may enter, circulate within and exit from the attenuator box,
    sound-absorbent material having the property of being pervious to air and disposed within the attenuator box in the proximity of but spaced from walls of the attenuator box, and
    air-flow direction means independent of the sound-absorbent material for affecting a plurality of changes in the direction of flow of air exhausted from the exhaust duct, whereby the air will circulate in a circuitous path generally from the inlet opening through the sound-absorbent material to the outlet opening and the sound carried by the circulating air may be attenuated.

2. A sound attenuator as described in claim 1 in which the air-flow direction means include an inlet baffle attached to the attenuator box adjacent the inlet opening for changing the direction of flow of air exhausted from the exhaust duct, and an outlet baffle attached to the attenuator box adjacent the outlet opening for changing the direction of flow of air exiting from the attenuator box.

3. A sound attenuator as described in claim 2 in which the outlet baffle is perforated to attenuate the exiting air.

4. A sound attenuator as described in claim 1 in which one of the walls is an openable access wall, and the sound-absorbent material is contained in acoustical panels removably mounted in the attenuator box, whereby the attenuator box may be opened and the acoustical panels may be removed therefrom and cleaned of dirt and water trapped by the sound-absorbent material contained therein.

5. The apparatus of claim 4, and means for removably mounting the acoustical panels in the attenuator box comprising pairs of panel receiving members mounted adjacent walls of the attenuator box and adapted to receive acoustical panels.

6. The apparatus in claim 5 in which the means for removably mounting the acoustical panels include pair of parallel panel receiving members mounted adjacent walls of the attenuator box and adapted to receive acoustical panels slidably inserted therein, and a pair of parallel panel receiving members mounted adjacent the access wall and adapted to receive an acoustical panel laid thereon.

7. A sound attenuator as described in claim 1 in which the inlet opening is in the proximity of the outlet opening and is separated from the outlet opening by air-flow direction means.

8. A sound attenuator as described in claim 7 in which the walls of the attenuator box include a top wall and the outlet opening is in the top wall.

9. A sound attenuator as described in claim 1 in which the sound-absorbent material is a material having the properties of resisting water corrosion and water absorption.

References Cited

UNITED STATES PATENTS

| 2,161,027 | 6/1939 | Dollinger | 230—232 XR |
| 1,968,312 | 7/1934 | Rensink. | |
| 2,458,258 | 1/1949 | Furr | 15—340 |
| 2,304,014 | 12/1942 | Paine | 15—326 XR |

FOREIGN PATENTS 1,047,231  12/1958  Germany.

ROBERT W. MICHELL, *Primary Examiner.*

U.S. Cl. X.R.

15—340